United States Patent
Take et al.

(10) Patent No.: US 6,762,535 B2
(45) Date of Patent: Jul. 13, 2004

(54) SPINDLE STRUCTURE IN ULTRASONIC MACHINE AND SUPPORTING HORN USED IN THE SAME

(75) Inventors: Yoshihiro Take, Fukuoka-ken (JP); Masayoshi Kawanami, Fukuoka-ken (JP)

(73) Assignee: Takesho Co., Ltd., Fukuoka-ken (JP)

( * ) Notice: Subject to any disclaimer, the term of this patent is extended or adjusted under 35 U.S.C. 154(b) by 224 days.

(21) Appl. No.: 10/114,706

(22) Filed: Apr. 1, 2002

(65) Prior Publication Data

US 2003/0085632 A1 May 8, 2003

(30) Foreign Application Priority Data

Nov. 7, 2001 (JP) ........................................ 2001-342391

(51) Int. Cl.[7] .......................... B23B 1/00; H01L 41/053
(52) U.S. Cl. ............. 310/323.18; 310/325; 310/323.08; 310/323.12; 310/323.13
(58) Field of Search ...................... 310/323.02, 323.04, 310/323.08, 323.12, 323.13, 323.18, 323.19, 325

(56) References Cited

U.S. PATENT DOCUMENTS

| | | | | |
|---|---|---|---|---|
| 2,891,180 A | * | 6/1959 | Elmore | ........................ 310/26 |
| 6,498,421 B1 | * | 12/2002 | Oh et al. | ................ 310/323.18 |
| 6,547,903 B1 | * | 4/2003 | McNichols et al. | ............ 156/64 |

FOREIGN PATENT DOCUMENTS

JP            00254801            9/2000    ............. B23B/1/00

* cited by examiner

*Primary Examiner*—Thomas M. Dougherty
(74) *Attorney, Agent, or Firm*—Jordan and Hamburg LLP

(57) ABSTRACT

The present invention is to provide a spindle structure of an ultrasonic machine which can reduce the number of assembling steps, can improve working accuracy, and can reduce heat generation due to an ultrasonic wave leakage during the working process. The spindle structure comprises: an ultrasonic vibrator 4 housed in a main body sleeve 3b formed in a spindle main body 3 rotationally driven, and a supporting horn 6 connected to the ultrasonic vibrator 4, wherein the supporting horn 6 comprises a main body 6a, a base portion 6c formed in a brim shape on an outer peripheral face of the main body 6a, an elastic cylindrical damping sleeve 6d formed by extending an outer periphery of the base portion 6c in the axial direction, a loose flange 6e and a fixing flange 6f formed on both ends of the damping sleeve 6d, and a buffer groove 6g formed on an outer peripheral face of the base portion 6c, wherein the loose flange 6e of the supporting horn 6 is disposed on the side of the ultrasonic vibrator 4 in a state that it is slidable to and has contact with an inner peripheral face of the main body sleeve 3b, and the fixing flange 6f is mounted on the main body sleeve 3b in a state that it is restrained in the axial direction.

20 Claims, 9 Drawing Sheets

(a)

(b)

SPINDLE STRUCTURE IN ULTRASONIC MACHINE AND SUPPORTING HORN USED IN THE SAME

BACKGROUND OF THE INVENTION

1. Field of the Invention

The present invention relates to a spindle structure in an ultrasonic machine which can perform grinding work, cutting work or the like on a workpiece with a high degree of accuracy and efficiency while applying ultrasonic vibration to various working tools.

2. Description of the Related Art

In a field of precision working of a member to be difficult to be worked, such as a highly hard brittle material, a metal composite material or the like, an ultrasonic machine is used as cutting working or boring working means. The ultrasonic machine is generally provided with a spindle rotationally driven by a motor, an ultrasonic vibrator arranged coaxially to the spindle, a horn connected to the ultrasonic vibrator integrally therewith, and a working tool, such as a cutting tool, a grinding tool or the like, which is mounted on the tip end of the horn, in which an ultrasonic vibration system is fixed in a high-rigid state.

In such an ultrasonic machine, in order to maintain preciseness capable of precision working, it is necessary to maintain the assembling precision of the spindle, the ultrasonic vibrator and the horn in a severe and high-rigid state. In addition, the most important object in designing is to make ultrasonic vibration applied by the ultrasonic vibrator completely coincide with the axial direction and to transmit the vibration to a machining tool with a constant amplitude of the vibration.

The present applicant has developed a spindle structure in an ultrasonic machining where ultrasonic vibration can be transmitted to a working tool for cutting work or grinding work without wobbling around a rotating shaft and with high efficiency, and cutting work or grinding work can be performed with extreme accuracy, and such a spindle structure has been disclosed in Unexamined Japanese Patent Publication No. 2000-254801.

FIG. 9 is a partial sectional view showing a spindle structure of an ultrasonic machine disclosed in the above publication. As shown in FIG. 9, the spindle structure is provided with a spindle 63 rotationally driven around an axial line thereof, an ultrasonic vibrator 64 housed in a hollow main body sleeve 63b formed in the spindle 63, two supporting horns 66, 67 connected coaxially to the ultrasonic vibrator 64 and fixed to an inner peripheral wall of the main body sleeve 63b in a constraining manner, a holder horn 65 whose proximal end is connected coaxially to the supporting horns 66, 67 and whose distal end is attachable to a cutting tool 68, and the like.

Also, the supporting horns 66, 67 comprise main bodies 66a, 67a arranged coaxially to the ultrasonic vibrator 64, base portions 66c, 67c integrally formed at intermediate portions, in axial directions, of the main bodies 66a, 67a, elastically deformable cylindrical thin damping sleeves 66d, 67d formed coaxially to the base portions 66c, 67c around the main bodies 66a, 67a, and flanges 66e, 66f, 67e, 67f formed on both ends of the damping sleeves 66d, 67d in their axial directions.

These supporting horns 66, 67 are provided inside the main body sleeve 63b of the spindle 63 in a state where they have close contact to each other, and the flanges 66e, 66f, 67e, 67f are fixed into the inner peripheral wall of the main body sleeve 63b. A spacer member (not shown) may be disposed between the flanges 66e and 66f, 66f and 67e, and 67e and 67f, respectively.

By employing such a spindle structure, ultrasonic vibration transmitted from the ultrasonic vibrator 64 to the main bodies 66a, 67a of the supporting horns 66, 67 are transmitted to the holder horn 65 side as they are. On the other hand, since the transmission to the spindle 63 is buffered by the damping sleeves 66d, 67d, the leak of ultrasonic vibration energy to the spindle 63 is suppressed. Thus the vibration transmission rate to the holder horn 65 can be kept high, while working accuracy can be significantly improved by maintaining the spindle 63, which is a main rotation shaft, and the holder horn 65 on the same axis.

In the spindle structure shown in FIG. 9, it is necessary to arrange, inside the main body sleeve 63b, the members such as the supporting horns 66, 67 and the spacers (not shown) in a state where they have close contact to each other without any gap therebetween, thereby restraining the members in both axial and peripheral directions of the spindle 63. In addition, the members should be assembled so as not to introduce any strain or concentrated stress on any member. Therefore, during the assembly process, it is necessary to precisely adjust the position and attitude of the respective members with the utmost care by watching to confirm that there is no gap between adjacent members upon every assembly of one member. This requires not only the skill and technique of the worker but also a vast number of assembling steps. Moreover, since a plurality of supporting horns, that is, the supporting horns 66, 67, are arranged to be in close contact with each other, core wobbling after assembly due to uneven size accuracy of the members cannot be avoided even when the members have been assembled with great care, which leads to poor machining accuracy.

Additionally, since the flanges 66e, 66f, 67e, 67f of the supporting horns 66, 67 are fixed into the inner peripheral wall of the main body sleeve 63b, a part of the ultrasonic vibration transmitted from the ultrasonic vibrator 64 to the main body 66a, 67a of the supporting horns 66, 67 may leak through the members such as the flanges 66e, 66f, 67e, 67f to the main body sleeve 63b to generate heat. In this regard, owing to the relatively large total length of the members such as the supporting horns 66, 67 coaxially connected, any deformation by the heat generation increases and, therefore, easily causing rolling of the cutting tool 68, which results in degradation of machining accuracy.

An object of the present invention is to provide a spindle structure of an ultrasonic machine capable of reducing the number of assembling steps and improving machining accuracy as well as a supporting horn used in the same.

SUMMARY OF THE INVENTION

A spindle structure of an ultrasonic machine according to the present invention comprises a spindle main body rotationally driven around an axial line thereof, an ultrasonic vibrator housed in a cylindrical main body sleeve formed in the spindle main body, and a supporting horn connected to the ultrasonic vibrator within the main body sleeve, wherein the supporting horn comprises a main body connected coaxially to the ultrasonic vibrator, a base portion formed in a brim shape on an outer peripheral face of the main body, an elastic cylindrical damping sleeve formed by extending an outer periphery of the base portion in the axial direction, a loose flange formed on one end of the damping sleeve, a fixing flange formed on the other end of the damping sleeve, and a gap portion formed on an outer peripheral face of the base portion along a circumferential direction thereof, the loose flange of the supporting horn being disposed on the side of the ultrasonic vibrator in a state that the loose flange is slidable to and has contact with an inner peripheral face of the main body sleeve and the fixing flange being mounted on the main body sleeve in such a state that the fixing flange is restrained in the axial direction. Here, the term "loose flange" means a flange which is restrained only in a diametrical direction by making an outer peripheral portion of the flange abut another member, and the term "fixing flange" means a flange which is restrained at least in the axial direction by making a face of the flange crossing in its axial direction abut another member. The term "gap portion" means a portion where continuity of an outer peripheral face is interrupted, for example, a portion where a hole, a groove, a slit or the like is formed.

The loose flange of the supporting horn is disposed on the side of the ultrasonic vibrator in a state that it is slidable to and has contact with the inner peripheral face of the main body sleeve and the fixing flange is fixed to the main body sleeve in a state where it is restrained in the axial direction, so that the supporting horn is restrained in the axial direction at the position of the fixing flange while the supporting horn is restrained in the diametrical direction but not restrained in the axial direction at the position of the loose flange. Therefore, the supporting horn main body allows efficient transmission of ultrasonic vibration applied from the ultrasonic vibrator in the axial direction by stretching/retracting motion of the supporting horn main body itself utilizing the fixing flange portion as a fulcrum. Also, since the gap portion is provided on the outer peripheral face of the base portion of the supporting horn along the circumferential direction, each of the loose flange and the fixing flange of the damping sleeve is easily deformed independently from the supporting horn main body, so that ultrasonic waves applied to the supporting horn main body is prevented from leaking to the main body sleeve through the loose flange and the fixing flange.

In other words, ultrasonic waves applied from the ultrasonic vibrator to the supporting horn can be transmitted to a working tool without leaking, thereby preventing heat generation caused by the ultrasonic wave leakage during the working process. This also eliminates rolling caused by minute deformation of the supporting horn due to heat generation, which leads to better working accuracy. In addition, since only the fixing flange is fixed to the main body sleeve, a spacer or the like is not required. As a result, the number of members is reduced and a strict adjustment is not required when assembling, so that the number of assembling steps can be remarkably decreased. Moreover, heat generation due to the ultrasonic waves leaking from the flange through a spacer can be prevented.

Here, as the gap portion of the supporting horn, provided is a buffer groove extending in a circumferential direction on an outer peripheral face of the base portion. Thus, the damping sleeve on the loose flange side and the damping sleeve on the fixing flange side are being separated in the axial direction by the buffer groove extending in the circumferential direction, so that both sides of the damping sleeve can be more easily deformed independently. Accordingly, a function preventing leakage of ultrasonic waves applied to the main body to the main body sleeve is further enhanced so that heat generation due to ultrasonic wave leakage during working process can be remarkably reduced.

Here, it is preferable that the length, in the axial direction, of the main body of the supporting horn is set to be ½ of the wavelength of an ultrasonic wave applied, the length, in the axial direction, of the damping sleeve of the supporting horn is set to be within ¼ of the wavelength of an ultrasonic wave applied, and the base portion is formed in an intermediate position of the main body in the axial direction and in an intermediate position of the damping sleeve in the axial direction. By this structure, the main body of the supporting horn, while efficiently vibrating itself with ultrasonic waves applied to the main body, can transmit the ultrasonic waves to the holder horn or the like. Thus, not only the working process becomes faster, leading to improved working efficiency, but also a function of preventing ultrasonic waves from leaking to the main body sleeve is enhanced, so that heat generation due to ultrasonic wave leakage during the working process can be suppressed to the minimum.

Furthermore, by setting the width of the buffer groove in a range of 0.1% to 3% of the wavelength of an ultrasonic wave applied, an excellent ultrasonic wave transmitting function and an excellent ultrasonic wave leakage preventing function are exhibited while maintaining the strength of the supporting horn, so that higher reliability and durability can be achieved while maintaining the working process efficiency at a high level.

By providing a portion where the outer diameter of the main body of the supporting horn varies continuously or intermittently along the axial direction of the main body within a range of the inner diameter of the damping sleeve, an amplifying-type supporting horn where the entire shape of the main body is gradually reduced in diameter from the ultrasonic vibrator side towards the holder horn side or a damping-type supporting horn where the entire shape is gradually increased in diameter towards the holder horn side is obtained. In either case, an excellent ultrasonic wave transmitting function and an excellent ultrasonic wave leakage preventing function can be exhibited, so that improvement in working accuracy and reduction in heat generation due to ultrasonic wave leakage during working process can be achieved.

Next, a supporting horn according to the present invention is a supporting horn which is connected to an ultrasonic vibrator disposed inside a spindle main body of an ultrasonic machine, the supporting horn comprising a main body connected coaxially to the ultrasonic vibrator, a base portion formed in a brim shape on an outer peripheral face of the main body, an elastic cylindrical damping sleeve formed by extending an outer peripheral portion of the base portion in the axial direction, a loose flange formed on one end of the damping sleeve, a fixing flange formed on the other end of the damping sleeve, and a gap portion provided along a circumferential direction on an outer peripheral face of the base portion.

By disposing the supporting horn on the side of the ultrasonic vibrator in a state where the loose flange of the supporting horn is slidable to and has contact with an inner peripheral face of the cylindrical main body sleeve provided inside the spindle main body of the ultrasonic machine and fixing the supporting horn to the main body sleeve in a state where the fixing flange is restrained in the axial direction, the supporting horn is restrained in the axial direction at the position of the fixing flange portion while the supporting horn is restrained in the diametrical direction but not restrained in the axial direction at the position of the loose flange. Therefore, the supporting horn main body allows efficient transmission of ultrasonic vibration applied from the ultrasonic vibrator in the axial direction by stretching/retracting motion of the supporting horn main body itself. Also, by providing the gap portion, each loose flange and fixing flange of the damping sleeve is easily deformed independently from the supporting horn main body, so that ultrasonic waves applied to the supporting horn main body is prevented from leaking to the main body sleeve through the loose flange and the fixing flange.

As described above, since it becomes possible to transmit ultrasonic waves applied from the ultrasonic vibrator to the holder horn and the like without wasting, heat generation due to ultrasonic wave leakage during working process can be remarkably reduced, thereby improving the working accuracy. In addition, since only the fixing flange is fixed to the main body sleeve, a spacer or the like is not required. As a result, the number of members is reduced and a strict adjustment is not required when assembling, so that the number of assembling steps can be remarkably decreased. Moreover, heat generation caused by fixing a spacer to the flange without any gap therebetween, which was a problem in the conventional structure, can be prevented.

Here, as the gap portion, provided is a buffer groove extending in a circumferential direction on an outer peripheral face of the base portion. Thus, the damping sleeve on the loose flange side and the damping sleeve on the fixing flange side are being separated in the axial direction by the buffer groove extending in the circumferential direction, so that both sides of the damping sleeve can be more easily deformed independently. Accordingly, a function preventing leakage of ultrasonic waves applied to the main body to the main body sleeve is further enhanced.

By setting the length, in the axial direction, of the main body of the supporting horn to ½ of the wavelength of an ultrasonic wave applied, setting the length, in the axial direction, of the damping sleeve of the supporting horn to within ¼ of the wavelength of an ultrasonic wave applied, and forming the base portion in an intermediate position of the main body in the axial direction and in an intermediate position of the damping sleeve in the axial direction, the main body of the supporting horn, while efficiently vibrating itself with ultrasonic waves applied to the main body, can transmit the ultrasonic waves to the holder horn or the like. Thus a function of preventing ultrasonic waves from leaking to the main body sleeve is enhanced.

By setting the width of the buffer groove in a range of 0.1% to 3% of the wavelength of an ultrasonic wave applied, an excellent ultrasonic wave transmitting function and an excellent ultrasonic wave leakage preventing function are exhibited while maintaining the strength of the supporting horn.

By providing a portion where the outer diameter of the main body of the supporting horn varies continuously or intermittently along the axial direction of the main body within a range of the inner diameter of the damping sleeve, an amplifying-type supporting horn where the entire shape of the main body is gradually reduced in diameter from the ultrasonic vibrator side towards the holder horn side or a damping type supporting horn where the entire shape is gradually increased in diameter towards the holder horn side is obtained. In either case, an excellent ultrasonic wave function and an excellent ultrasonic wave leakage preventing function can be exhibited.

BRIEF DESCRIPTION OF THE DRAWINGS

FIGS. 4A and 4B are illustrative diagrams exaggeratedly showing how a supporting horn is deformed when applied with ultrasonic vibration, in which FIG. 4A shows deformation in a stretched manner and FIG. 4B shows deformation in a retracted manner;

FIGS. 5A and 5B are illustrative diagrams exaggeratedly showing how respective members constituting an ultrasonic wave transmission path are deformed, in which FIG. 5A shows deformation in a stretched manner, and FIG. 5B shows deformation in a retracted manner;

DESCRIPTION OF THE PREFERRED EMBODIMENTS

Figure 1:
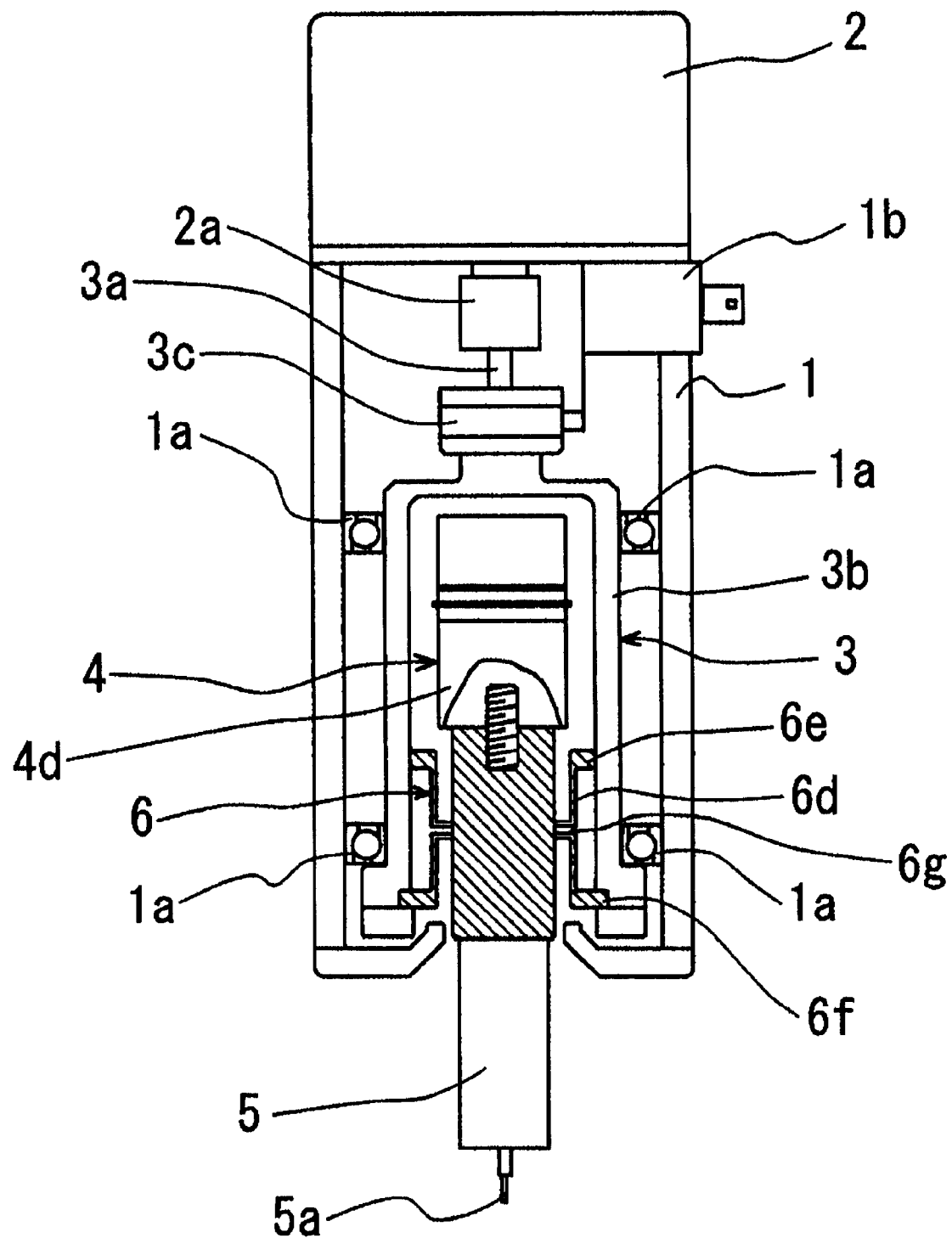
FIG. 1 is a schematic longitudinal sectional view showing a spindle structure of an ultrasonic machine which is an embodiment of the present invention.
Figure 2:
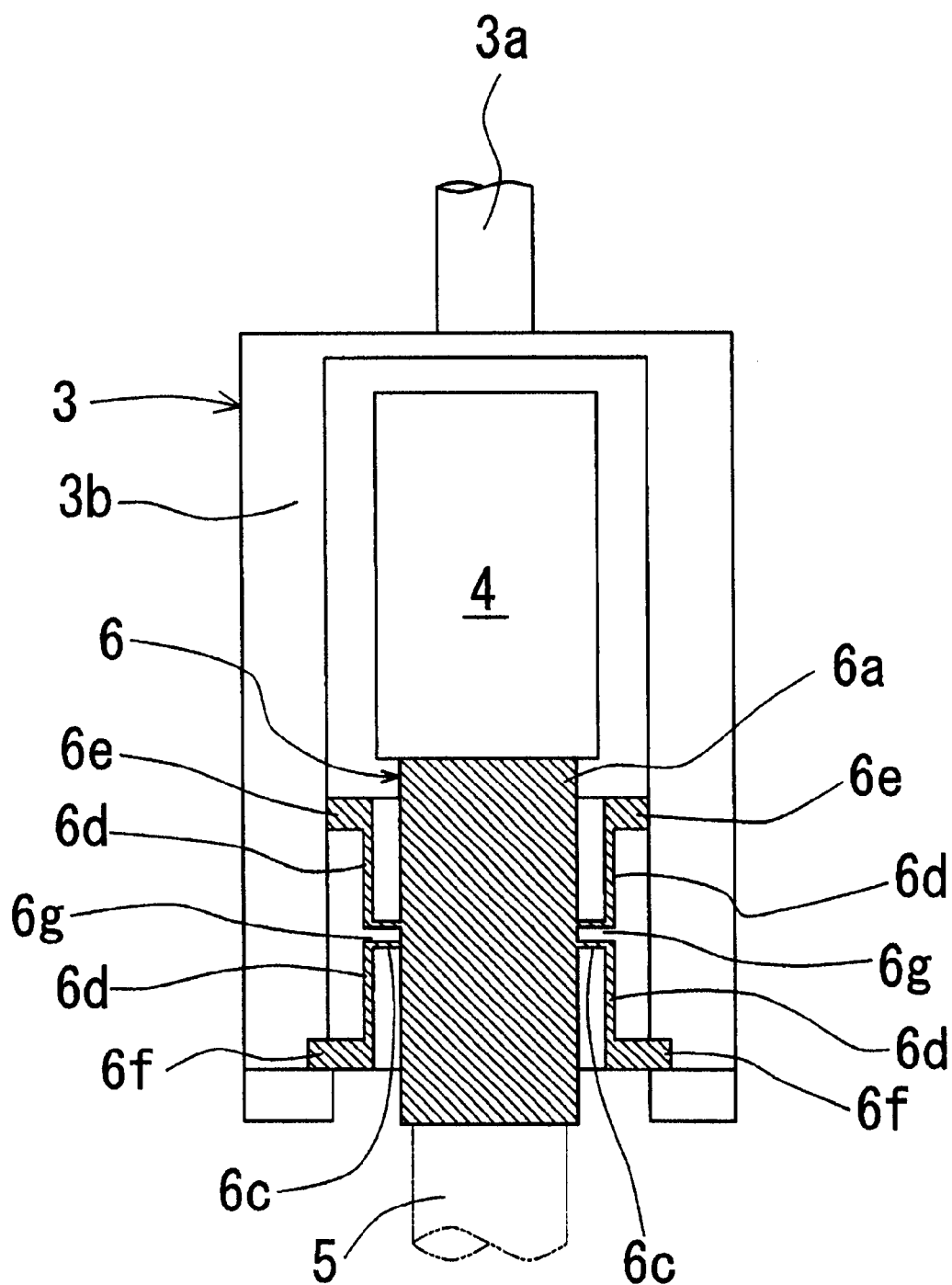
FIG. 2 is an enlarged sectional view of a portion of the spindle structure in the vicinity of a spindle main body in FIG. 1.
Figure 3A:
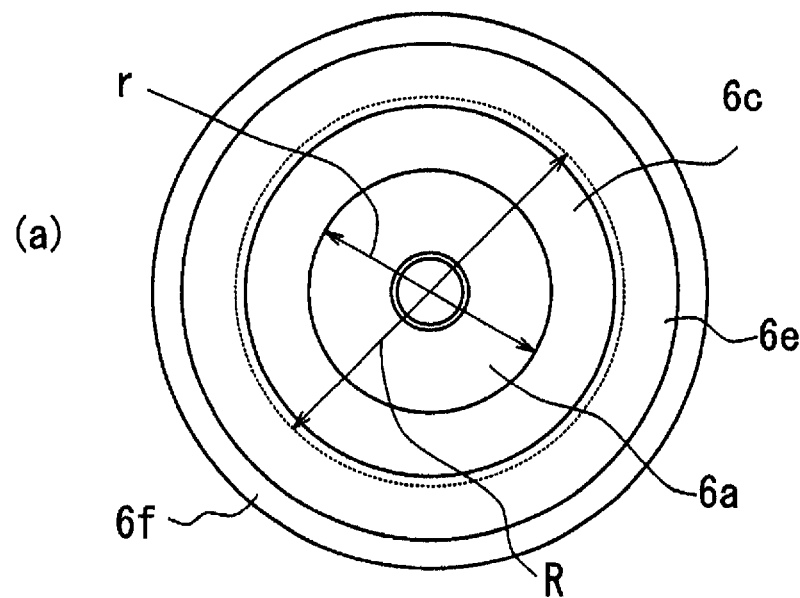
FIG. 3A is a plan view of a supporting horn constituting the spindle structure shown in FIG. 1.
Figure 3B:
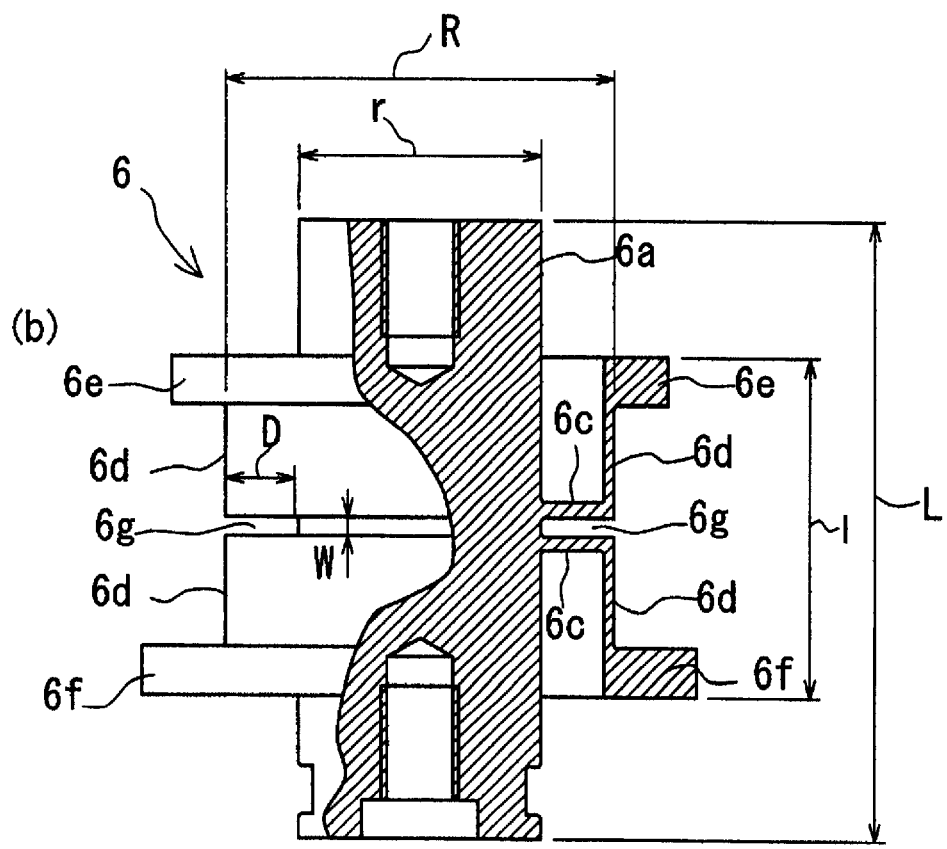
FIG. 3B is a partially cut-off side view of the supporting horn.

FIG. 1 is a schematic longitudinal sectional view showing a spindle structure of an ultrasonic machine which is an embodiment of the present invention; FIG. 2 is an enlarged sectional view of a portion of the spindle structure in the vicinity of a spindle main body in FIG. 1; FIG. 3A is a plan view of a supporting horn constituting the spindle structure shown in FIG. 1; and FIG. 3B is a partially cut-off side view of the supporting horn.

As shown in FIG. 1 and FIG. 2, a hollow cylindrical housing 1 is provided at its upper end with a driving motor 2, and a spindle main body 3 which is connected to an output shaft of the driving motor 2 via a coupling 2a is assembled in the housing 1 via a bearing 1a coaxially thereto. The spindle main body 3 is provided with a rod 3a whose upper end side is connected to the coupling 2a and a cylindrical main body sleeve 3b which is formed at a lower end of the rod 3a coaxially thereto and whose lower end is opened.

Right below the rod 3a, which is connected to the coupling 2a, an annular electricity receiving portion 3c is provided, and electrical conduction to the receiving portion 3c is made from a power supplying unit 1b fixed to the housing 1 via a power supplying brush. Then, an ultrasonic vibrator 4 which is made conductive to the receiving portion 3c is accommodated in the main body sleeve 3b, and a supporting horn 6 and a holder horn 5 are arranged to be coaxially connected to each other at a lower end of the ultrasonic vibrator 4.

The ultrasonic vibrator 4 has a lower end portion serving as an output portion 4d functioning as a mass point amplifying ultrasonic vibration. The ultrasonic vibrator 4 is made conductive to the annular electricity receiving portion 3c mounted to the rod 3a of the spindle main body 3 via a lead wire. When conduction is made from the power supplying unit 1b, ultrasonic vibration of 15 kHz to 65 kHz whose vibration direction is coincident with the axial direction are generated.

In the main body sleeve 3b of the spindle main body 3, the ultrasonic vibrator 4 is so disposed as to be coaxially connected to the supporting horn 6, and the holder horn 5 is disposed so as to be coaxially connected to the supporting horn 6. Thus, ultrasonic vibration induced at the output portion 4d are transmitted to the holder horn 5 via the supporting horn 6.

The supporting horn 6 is, for example, an integrally-formed mold product made of stainless steel material. As shown in FIG. 3, the supporting horn 6 comprises a solid cylindrical main body 6a connected coaxially to the ultrasonic vibrator 4, a base portion 6c formed in a brim shape on an outer peripheral face of the main body 6a, an elastic cylindrical damping sleeve 6d formed by extending an outer periphery of the base portion 6c in the axial direction, a loose flange 6e formed at one end (an end portion positioned on the side of the ultrasonic vibrator 4) of the damping sleeve 6d, and an fixing flange 6f formed on the other end of the damping sleeve 6f, and a buffer groove 6g formed on an outer peripheral face of the base portion 6c along the circumferential direction thereof.

The supporting horn 6 is arranged on the side of the ultrasonic vibrator 4 in a state where the supporting horn 6 has been restrained in its diametrical direction by making an outer peripheral face of the loose flange 6e abut an inner peripheral face of the main body sleeve 3b, and the fixing flange 6f is fixed at a distal end of the sleeve 3b in a state where it is restrained at least in a diametrical direction by bringing a face of the fixing flange 6f crossing in the axial direction in contact with a distal end portion of the main body sleeve 3 to fix the fixing flange. By this structure, since the supporting horn 6 is restrained at least in the axial direction at the position of the fixing flange 6f while the supporting horn 6 is restrained in the diametrical direction but not restrained in the axial direction at the position of the loose flange 6e, the main body 6a of the supporting horn 6 can efficiently transmit ultrasonic vibration applied from the ultrasonic vibrator 4 in the axial direction according to its own stretching/retracting motion. In addition, by providing a buffer groove 6g serving as a gap portion on an outer peripheral face of the base portion 6c of the supporting horn 6 along the circumferential direction, each of the loose flange 6e and the fixing flange 6f of the damping sleeve is easily deformed independently, so that ultrasonic waves applied to the main body 6a is prevented from leaking to the main body sleeve 3b.

In other words, ultrasonic waves applied from the ultrasonic vibrator 4 to the supporting horn 6 are transmitted to a cutting tool 5a via the holder horn 5 or the like without leaking, thereby preventing heat generation caused by the ultrasonic wave leakage during the working process. This also eliminates influence by minute deformation of the supporting horn or the like due to heat generation, which leads to improved rotational swinging accuracy, and working accuracy is not affected at a high speed rotation and is improved. Moreover, since only the fixing flange 6f is fixed to the main body sleeve 3b in a state where the fixing flange 6f has been restrained in the axial direction, a spacer or the like is not required. As a result, the number of members is reduced and a strict adjustment is not required when assembling, so that the number of assembling steps can be considerably decreased. Furthermore, heat generation caused by fixing a spacer to the flange without any gap therebetween, which was a problem in the conventional structure, can be prevented.

Figure 4A:
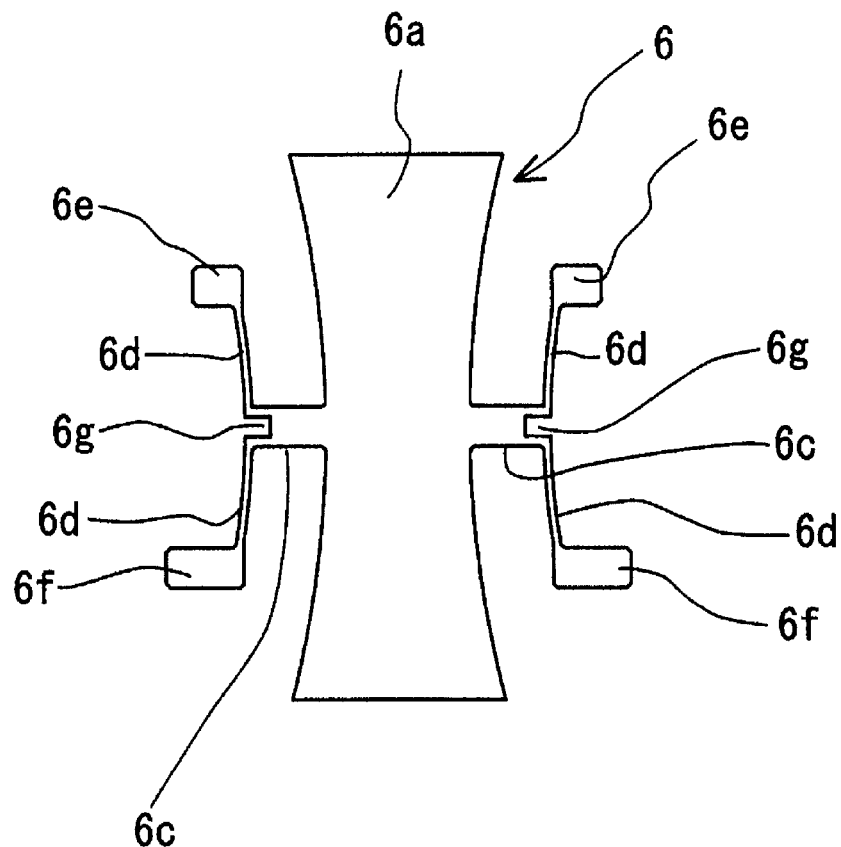
Figure 4B:
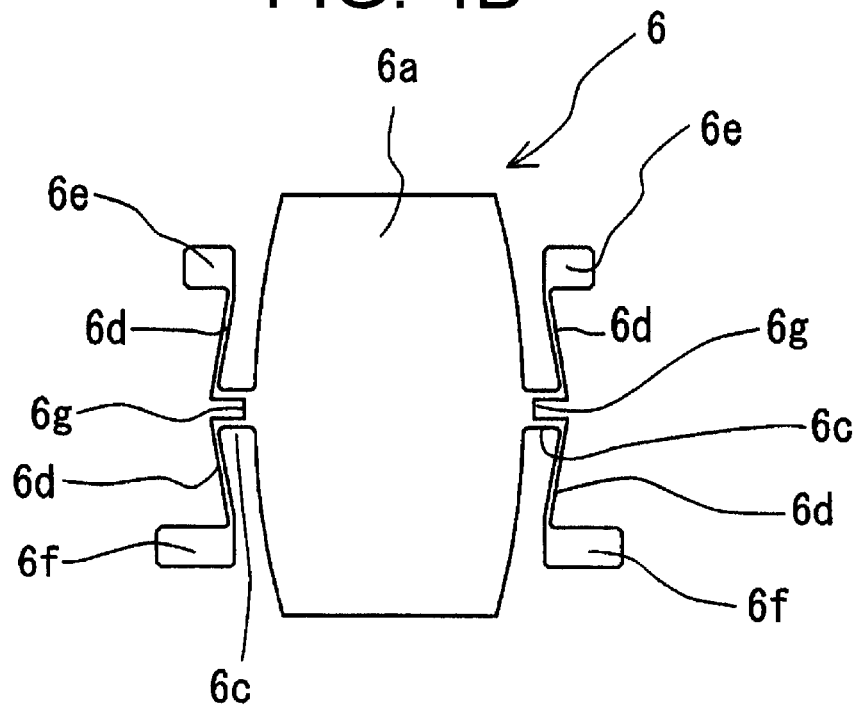
Figure 5A:
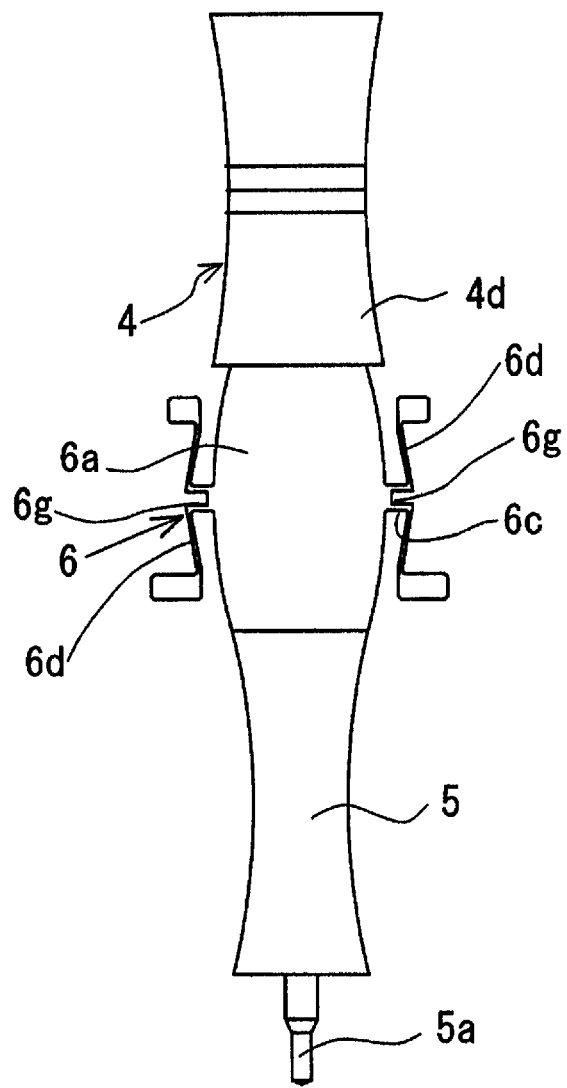
Figure 5B:
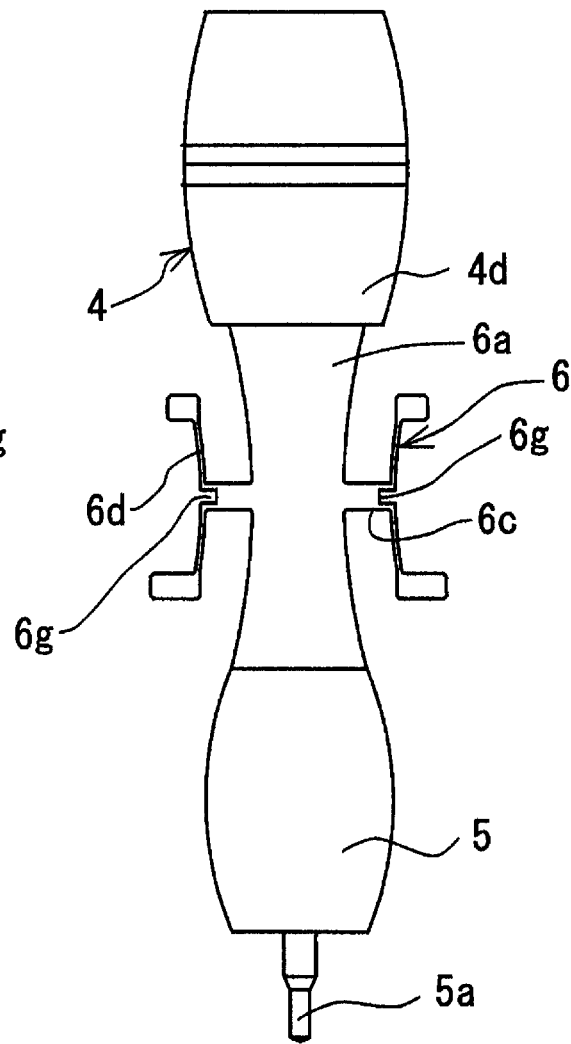

Here, with reference to FIG. 4 and FIG. 5, explained is how the supporting horn 6 is deformed when ultrasonic vibration is applied from the output portion 4d of the ultrasonic vibrator 4. FIGS. 4A and 4B are illustrative diagrams exaggeratedly showing how a supporting horn is deformed when ultrasonic vibration is applied, in which FIG. 4A shows deformation in a stretched manner and FIG. 4B shows deformation in a retracted manner. FIGS. 5A and 5B are illustrative diagrams exaggeratedly showing how respective members constituting an ultrasonic wave transmission path are deformed, in which FIG. 5A shows deformation in a stretched manner, and FIG. 5B shows deformation in a retracted manner.

When ultrasonic vibration acts in the axial direction of the supporting horn 6, the supporting horn 6 repeats deformation where the main body 6a contracts in the axial direction and expands in the radial direction as shown in FIG. 4B, and deformation where the main body 6a stretches in the axial direction and contracts in the radial direction as shown in FIG. 4A, alternately. Such repeated contracting and stretching deformation of the supporting horn 6 is transmitted to the holder horn 5 connected to the lower end of the supporting horn 6, and the holder horn 5 also repeats the contracting and stretching deformation as the supporting horn 6. The difference between the contracting deformation and the stretching deformation of the holder horn 5 forms amplitude of an ultrasonic vibration of the cutting tool 5a.

When the supporting horn 6 repeats the contracting and stretching deformation as shown in FIGS. 4A and 4B, the damping sleeve 6d is easily deformed elastically due to its thin thickness, so that the ultrasonic vibration of the main body 6a is absorbed by the elastic deformation. That is, since the ultrasonic vibration transmitted from the ultrasonic vibrator 4 to the main body 6a of the supporting horn 6 is buffered by the damping sleeve 6d when transmitted to the main body sleeve 3b of the spindle 3, the ultrasonic vibration can be transmitted in the direction of the holder horn 5 with a high efficiency without leakage of the ultrasonic vibration to the sleeve 3b.

In this embodiment, as shown in FIGS. 3A and 3B, a length L, which is the length of the main body 6a of the supporting horn 6 in the axial direction, is set to be ½ of the wavelength of an ultrasonic wave applied, and the base portion 6c is formed in an intermediate position of the length L of the main body 6a. By this structure, the main body 6a of the supporting horn 6, while efficiently vibrating itself with ultrasonic waves applied to the main body 6a, can transmit the ultrasonic waves to the holder horn 5 or the like, thereby speeding up the working process and improving working efficiency.

A length l, which is the length of the damping sleeve 6d of the supporting horn 6 in the axial direction, is set to be within ¼ of the wavelength of an ultrasonic wave applied, and the base portion 6c is formed in an intermediate position of the length l of the damping sleeve 6d. By this structure, a function for preventing an ultrasonic wave applied to the main body 6a of the supporting horn 6 from leaking into the main body sleeve 3b is enhanced to the highest level, so that heat generation due to the ultrasonic wave leakage during the working process can be suppressed to the minimum.

A width W of the buffer groove 6g is set to be 3% of the wavelength of an ultrasonic wave applied and a depth D of the buffer groove 6g is set to be a size of ½ of a difference between an outer diameter R of the base portion 6c and an outer diameter r of the main body 6a at the position of the main body 6a. By this structure, an excellent ultrasonic wave transmitting function and ultrasonic wave leakage preventing function are exhibited while maintaining the strength required for the supporting horn 6, and excellent reliability and durability are achieved while maintaining the working process efficiency at a high level.

Figure 6:
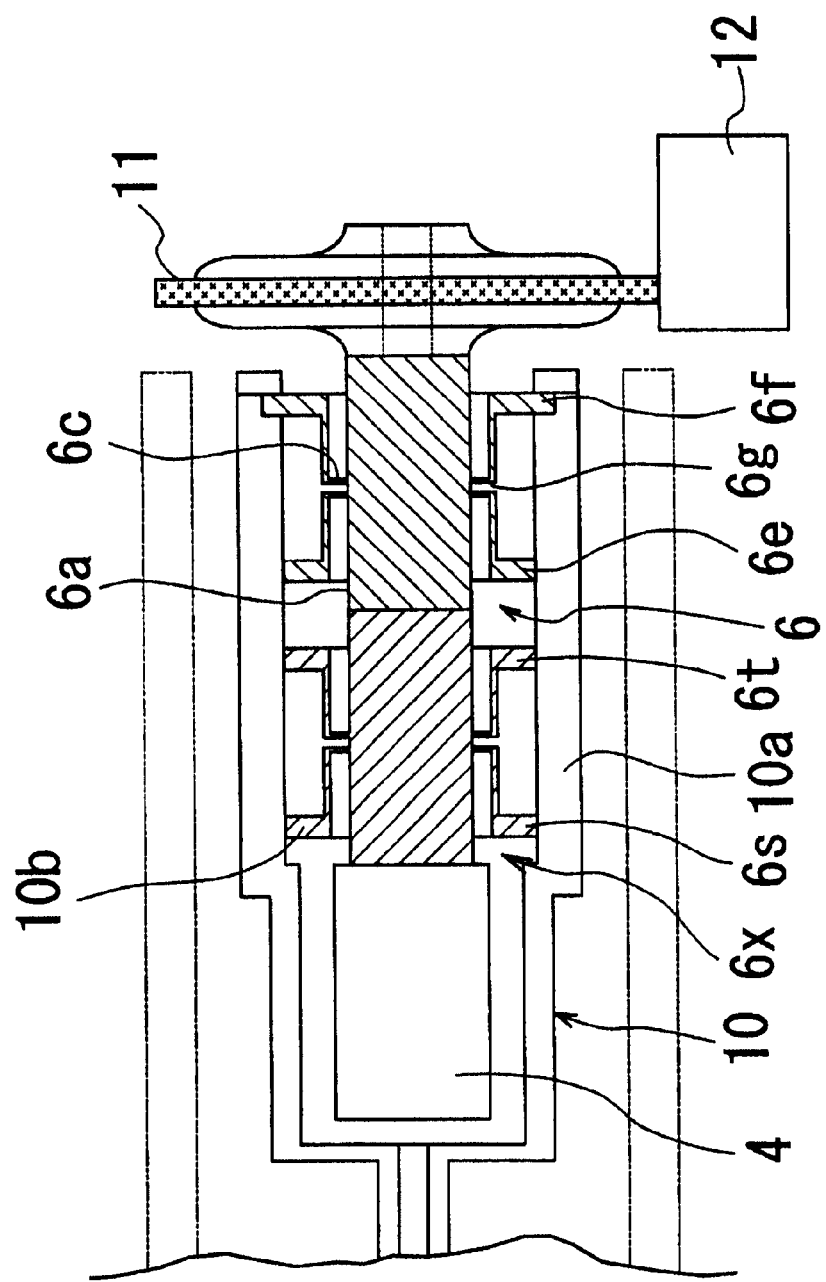
FIG. 6 is a schematic longitudinal sectional view showing a spindle structure of an ultrasonic machine which is another embodiment of the present invention.

FIG. 6 is a schematic sectional view showing a spindle structure of an ultrasonic machine which is another embodiment of the present invention. In this embodiment, the ultrasonic vibrator 4, a supporting horn 6x and the supporting horn 6 are arranged to be connected to each other within a main body sleeve 10a of a spindle 10 of an ultrasonic machine, and a working tool 11 is mounted to a distal end of the supporting horn 6. The shape and function of the supporting horn 6 and the fixing structure of the supporting horn 6 to the main body sleeve 10a are similar to the shape and function of the supporting horn 6 and the fixing structure of the supporting horn 6 to the sleeve 3a shown in FIGS. 1 to 5.

The supporting horn 6x has the shape and function similar to those of the supporting horn 6 except that two loose flanges 6s, 6t having the same diameter are provided. At the positions of the loose flanges 6s, 6t, the supporting horn 6x is restrained in the diametrical direction but not restrained in the axial direction.

With the above structure, ultrasonic vibration applied from the ultrasonic vibrator 4 can be efficiently transmitted to the working tool 11 via the supporting horn 6x and the supporting horn 6 while preventing the ultrasonic vibration from leaking to the main body sleeve 10a. Accordingly, a cutting process can be performed on a workpiece 12 at a high speed with high accuracy, and heat generation from the ultrasonic vibrating system during the working process can be remarkably reduced. In addition, in this embodiment, since the two supporting horns 6x, 6 are disposed so as to be connected coaxially to each other, the spindle structure is strong against a moment force received from the working tool 11 and is therefore preferable for a higher output from the vibrator 4 and when a large amount of the workpiece 12 are processed. The other functions and effects of this embodiment are similar to those of the embodiment shown in FIGS. 1 to 5.

Figure 7:
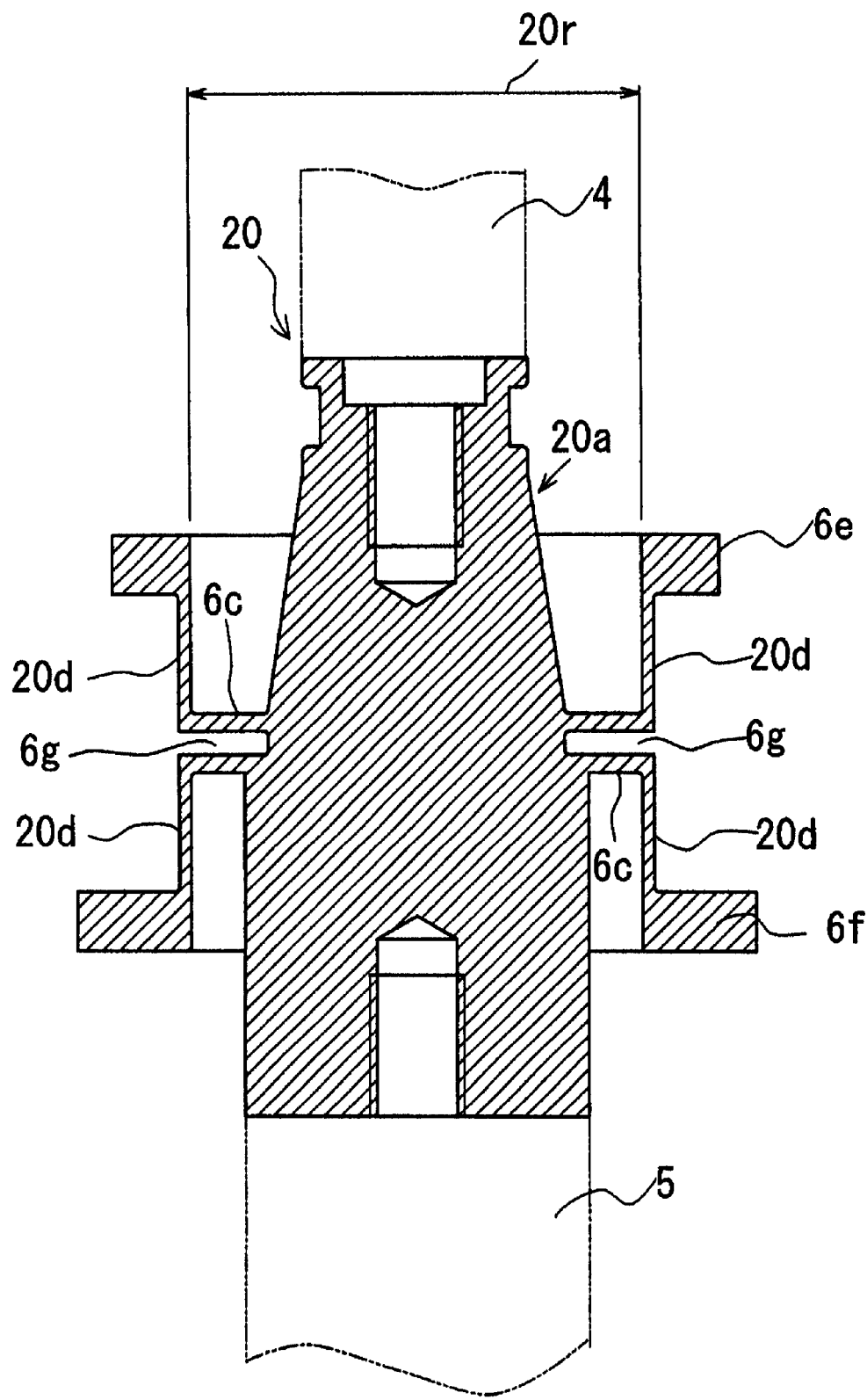
FIG. 7 is an axial sectional view showing a damping-type supporting horn which is another embodiment of the present invention.
Figure 8:
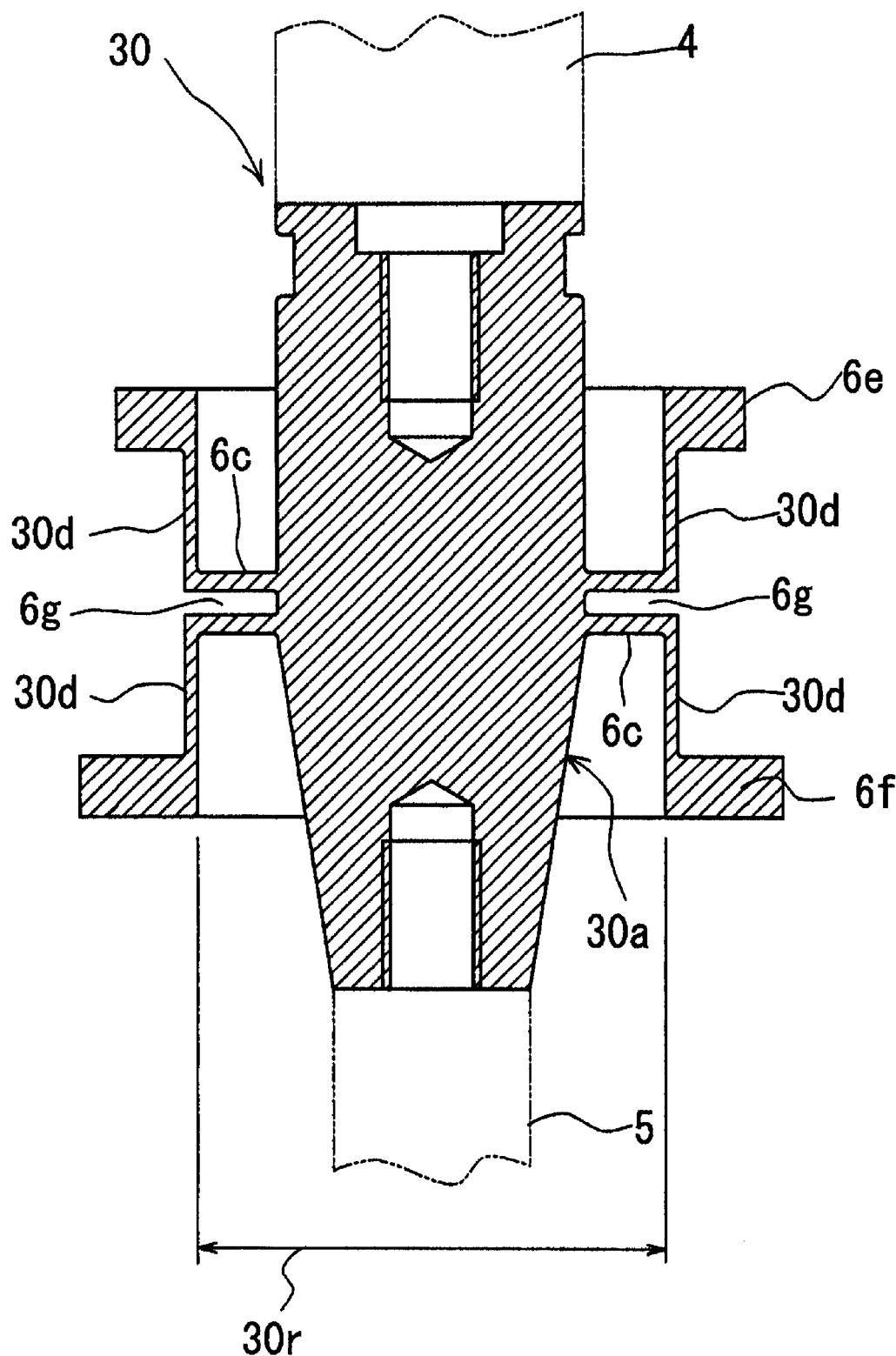
FIG. 8 is an axial sectional view showing an amplifying-type supporting horn which is another embodiment of the present invention.
Figure 9:
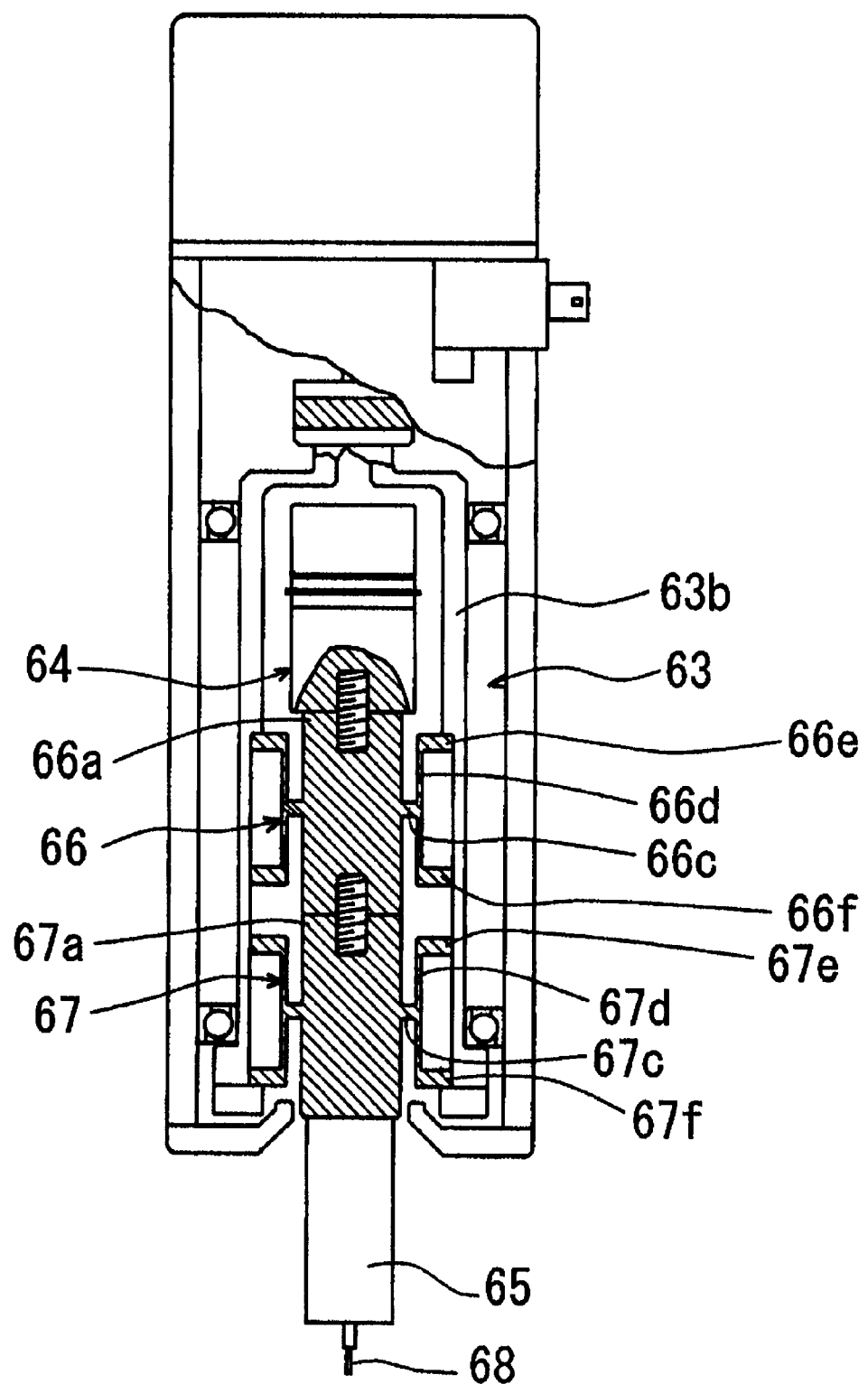
FIG. 9 is a schematic longitudinal sectional view showing a main portion of a spindle structure of a conventional ultrasonic machine.

Next, with reference to FIG. 7 and FIG. 8, supporting horns 20 and 30, which are other embodiments of the present invention, will be explained. In FIGS. 7 and 8, portions bearing the same reference numerals as those in FIGS. 1 to 5 indicate the portions having the same functions and effects as the portions shown in FIGS. 1 to 5, and explanation thereof is omitted.

The supporting horn 20 shown in FIG. 7 is provided with a portion with a continuously increasing outer diameter of a main body 20a along the axial direction of the main body 20a toward the holder horn 5 within the range of an inner diameter 20r of a damping sleeve 20d, thereby forming a damping-type supporting horn in which the main body 20a is formed to be gradually increased in diameter from the ultrasonic vibrator 4 side toward the holder horn 5 side. A spindle structure of an ultrasonic machine formed with this damping-type supporting horn 20 enables the ultrasonic machine to be optimally adapted to working conditions for a workpiece, so that the working accuracy is improved. Other functions and effects of the supporting horn in this embodiment are similar to those in the supporting horn 6 mentioned previously.

The supporting horn 30 shown in FIG. 8 is provided with a portion with a continuously decreasing outer diameter of a main body 30a along the axial direction of the main body 30a toward the holder horn 5 within the range of an inner diameter 30r of a damping sleeve 30d, thereby forming an amplifying-type supporting horn in which the main body 30a is formed to be gradually decreased in diameter from the ultrasonic vibrator 4 side towards the holder horn 5 side. A spindle structure of an ultrasonic machine formed with this amplifying-type supporting horn 30, as well as the above-mentioned supporting horn 20, enables the ultrasonic machine to be optimally adapted to working conditions for a workpiece, so that the working accuracy is improved. Other functions and effects of the supporting horn in this embodiment are similar to those in the supporting horn 6 mentioned previously.

According to the present invention, the following advantages will be obtained.

(1) By employing the spindle structure comprising a spindle main body rotationally driven around an axial line thereof, an ultrasonic vibrator housed in a cylindrical main body sleeve formed in the spindle main body, and a supporting horn connected to the ultrasonic vibrator within the main body sleeve, wherein the supporting horn comprises a main body connected coaxially to the ultrasonic vibrator, a base portion formed in a brim shape on an outer peripheral face of the main body, an elastic cylindrical damping sleeve formed by extending an outer periphery of the base portion in the axial direction, a loose flange formed on one end of the damping sleeve, a fixing flange formed on the other end of the damping sleeve, and a gap portion formed on an outer peripheral face of the base portion along a circumferential direction thereof, the loose flange being disposed on the side of the ultrasonic vibrator in a state that the loose flange is slidable to and has contact with an inner peripheral face of the main body sleeve and the fixing flange being mounted on the main body sleeve in a state that the fixing flange is restrained in the axial direction, the number of assembling steps of a spindle is reduced, the working accuracy is improved, and heat generation due to ultrasonic wave leakage during the working process can be decreased.

(2) By providing the buffer groove extending in the circumferential direction on the outer peripheral face of the base portion as the gap portion of the supporting horn, the function for preventing an ultrasonic wave applied to the main body from leaking to the main body sleeve is further enhanced, so that heat generation due to ultrasonic wave leakage during the working process can be remarkably reduced.

(3) By setting the length, in the axial direction, of the main body of the supporting horn to be ½ of the wavelength of an ultrasonic wave applied, setting the length, in the axial direction, of the damping sleeve of the supporting horn within ¼ of the wavelength of an ultrasonic wave applied, and forming the base portion in an intermediate position of the main body in the axial direction and in an intermediate position of the damping sleeve in the axial direction, the speed of the working process is increased and working efficiency is improved. Furthermore, heat generation due to ultrasonic wave leakage during the working process can be suppressed to the minimum level.

(4) By setting the width of the buffer groove to be from 0.1% to 3% of the wavelength of an ultrasonic wave applied, excellent durability can be achieved while maintaining the working process efficiency at a high level.

(5) By providing a portion where the outer diameter of the main body of the supporting horn varies continuously or intermittently along the axial direction of the main body within the range of the inner diameter of the buffer sleeve, the amplifying-type supporting horn or the damping-type supporting horn can be obtained. In either case, the optimal working conditions can be selected, so that the working accuracy can be improved.

While particular embodiments of the present invention have been shown and described, numerous variations and alternate embodiments will occur to those skilled in the art. Accordingly, it is intended that the invention be limited only by the appended claims.

What is claimed is:

1. A spindle structure of an ultrasonic machine comprising a spindle main body rotationally driven around an axial line thereof, an ultrasonic vibrator housed in a cylindrical main body sleeve formed in the spindle main body, and a supporting horn connected to the ultrasonic vibrator within the main body sleeve, wherein said supporting horn comprises a main body connected coaxially to the ultrasonic vibrator, a base portion formed in a brim shape on an outer peripheral face of the main body, an elastic cylindrical damping sleeve formed by extending an outer periphery of the base portion in the axial direction, a loose flange formed on one end of the damping sleeve, an fixing flange formed on the other end of the damping sleeve, and a gap portion formed on an outer peripheral face of the base portion along a circumferential direction thereof, said loose flange of the supporting horn being disposed on a side of the ultrasonic vibrator in a state that the loose flange is slidable to and has contact with an inner peripheral face of the main body sleeve and said fixing flange being mounted on the main body sleeve in a state that the fixing flange is restrained in the axial direction.

2. The spindle structure of an ultrasonic machine according to claim 1, wherein said gap portion of the supporting horn is a buffer groove extending in a circumferential direction on an outer peripheral face of the base portion.

3. The spindle structure of an ultrasonic machine according to claim 1, wherein a length, in the axial direction, of the main body of the supporting horn is set to be ½ of a wavelength of an ultrasonic wave applied, a length, in the axial direction, of the damping sleeve of the supporting horn is set within ¼ of the wavelength of the ultrasonic wave applied, and the base portion is formed in an intermediate position of the main body in the axial direction and in an intermediate position of the damping sleeve in the axial direction.

4. The spindle structure of an ultrasonic machine according to claim 2, wherein a length, in the axial direction, of the main body of the supporting horn is set to be ½ of a wavelength of an ultrasonic wave applied, a length, in the axial direction, of the damping sleeve of the supporting horn is set within ¼ of the wavelength of the ultrasonic wave applied, and the base portion is formed in an intermediate position of the main body in the axial direction and in an intermediate position of the damping sleeve in the axial direction.

5. The spindle structure of an ultrasonic machine according to claim 2, wherein a width of the buffer groove is set to be from 0.1% to 3% of a wavelength of the ultrasonic wave applied.

6. The spindle structure of an ultrasonic machine according to claim 1, wherein said main body of the supporting horn has a portion where an outer diameter of the main body varies continuously or intermittently along the axial direction of the main body within a range of an inner diameter of the damping sleeve is provided.

7. The spindle structure of an ultrasonic machine according to claim 2, wherein said main body of the supporting horn has a portion where an outer diameter of the main body varies continuously or intermittently along the axial direction of the main body within a range of an inner diameter of the damping sleeve is provided.

8. The spindle structure of an ultrasonic machine according to claim 3, wherein said main body of the supporting horn has a portion where an outer diameter of the main body varies continuously or intermittently along the axial direction of the main body within a range of an inner diameter of the damping sleeve is provided.

9. The spindle structure of an ultrasonic machine according to claim 4, wherein said main body of the supporting horn has a portion where an outer diameter of the main body varies continuously or intermittently along the axial direction of the main body within a range of an inner diameter of the damping sleeve is provided.

10. The spindle structure of an ultrasonic machine according to claim 5, wherein said main body of the supporting horn has a portion where an outer diameter of the main body varies continuously or intermittently along the axial direction of the main body within a range of an inner diameter of the damping sleeve is provided.

11. A supporting horn which is connected to an ultrasonic vibrator disposed inside of a spindle main body of an ultrasonic machine, comprising:

a main body connected coaxially to the ultrasonic vibrator, a base portion formed in a brim shape on an outer peripheral face of the main body, an elastic cylindrical damping sleeve formed by extending an outer peripheral portion of the base portion in the axial direction, a loose flange formed on one end of the damping sleeve, a fixing flange formed on the other end of the damping sleeve, and a gap portion provided along a circumferential direction on an outer peripheral face of the base portion.

12. The supporting horn according to claim 11, wherein said gap portion is a buffer groove extending in a circumferential direction on an outer peripheral face of the base portion.

13. The supporting horn according to claim 11, wherein a length, in the axial direction, of the main body is set to be ½ of a wavelength of an ultrasonic wave applied, a length, in the axial direction, of the damping sleeve is set within ¼ of the wavelength of the ultrasonic wave applied, and the base portion is formed in an intermediate position of the main body in the axial direction and in an intermediate position of the damping sleeve in the axial direction.

14. The supporting horn according to claim 12, wherein a length, in the axial direction, of the main body is set to be ½ of a wavelength of an ultrasonic wave applied, a length, in the axial direction, of the damping sleeve is set within ¼ of the wavelength of the ultrasonic wave applied, and the base portion is formed in an intermediate position of the main body in the axial direction and in an intermediate position of the damping sleeve in the axial direction.

15. The supporting horn according to claim 12, wherein a width of the buffer groove is set to be from 0.1% to 3% of a wavelength of an ultrasonic wave applied.

16. The supporting horn according to claim 11, wherein said main body has a portion where an outer diameter of the main body varies continuously or intermittently along the axial direction of the main body within a range of an inner diameter of the damping sleeve is provided.

17. The supporting horn according to claim 12, wherein said main body has a portion where an outer diameter of the main body varies continuously or intermittently along the axial direction of the main body within a range of an inner diameter of the damping sleeve is provided.

18. The supporting horn according to claim 13, wherein said main body has a portion where an outer diameter of the main body varies continuously or intermittently along the axial direction of the main body within a range of an inner diameter of the damping sleeve is provided.

19. The supporting horn according to claim 14, wherein said main body has a portion where an outer diameter of the main body varies continuously or intermittently along the axial direction of the main body within a range of an inner diameter of the damping sleeve is provided.

20. The supporting horn according to claim 15, wherein said main body has a portion where an outer diameter of the main body varies continuously or intermittently along the axial direction of the main body within a range of an inner diameter of the damping sleeve is provided.

* * * * *